July 11, 1939.  C. W. YERGER ET AL  2,165,326

ELECTROLYTIC TREATMENT OF FERROUS METALS

Original Filed Oct. 30, 1934  3 Sheets—Sheet 1

Inventors
CHARLES W. YERGER,
GUERIN TODD,

By Toulmin & Toulmin
Attorneys

July 11, 1939.     C. W. YERGER ET AL     2,165,326
ELECTROLYTIC TREATMENT OF FERROUS METALS
Original Filed Oct. 30, 1934     3 Sheets-Sheet 2
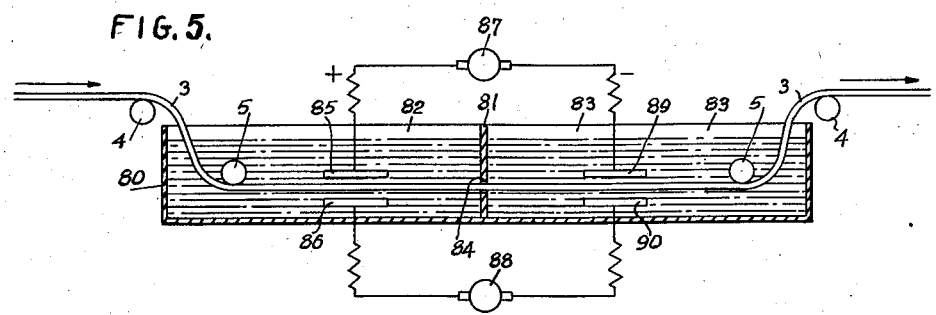
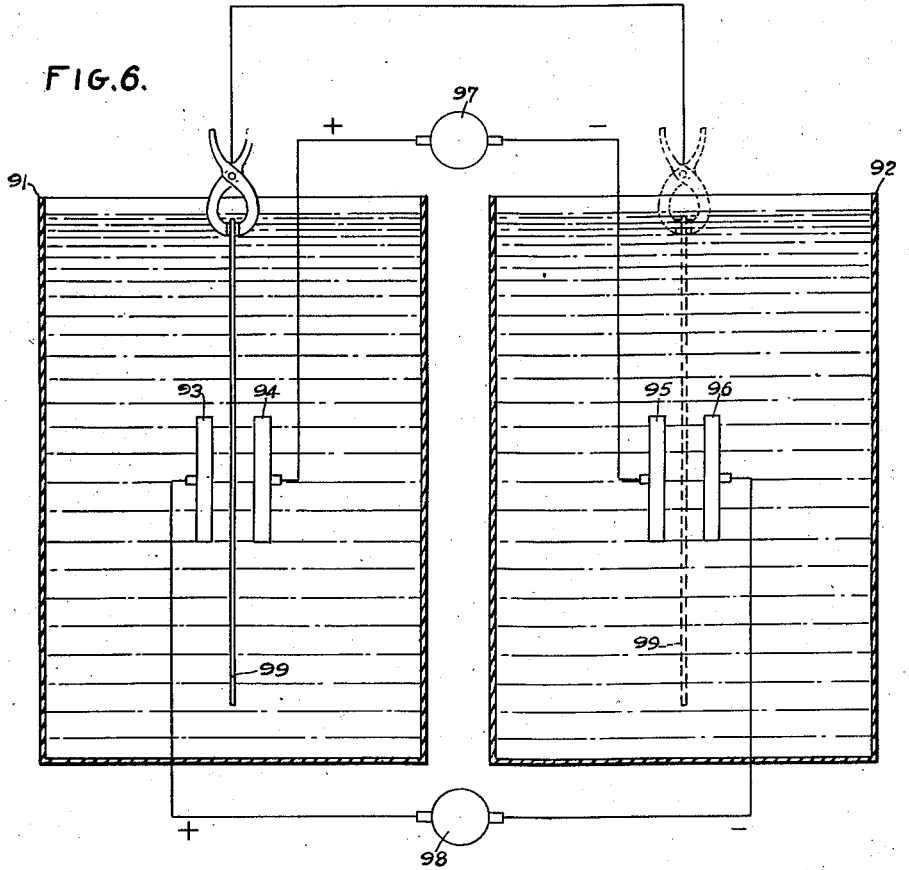
Inventors
CHARLES W. YERGER,
GUERIN TODD,
BY
Toulmin & Toulmin
Attorneys July 11, 1939.  C. W. YERGER ET AL  2,165,326
ELECTROLYTIC TREATMENT OF FERROUS METALS
Original Filed Oct. 30, 1934  3 Sheets-Sheet 3
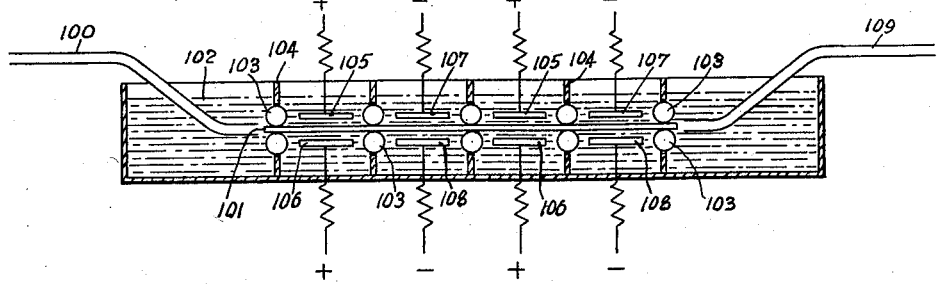
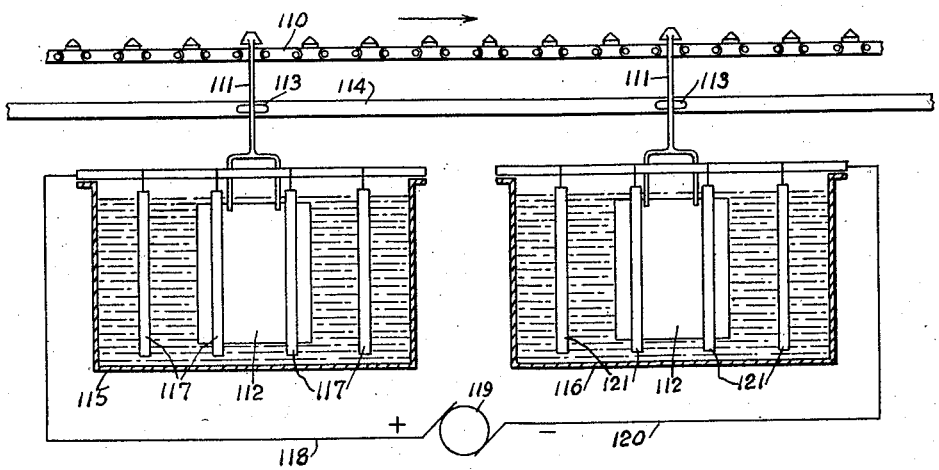
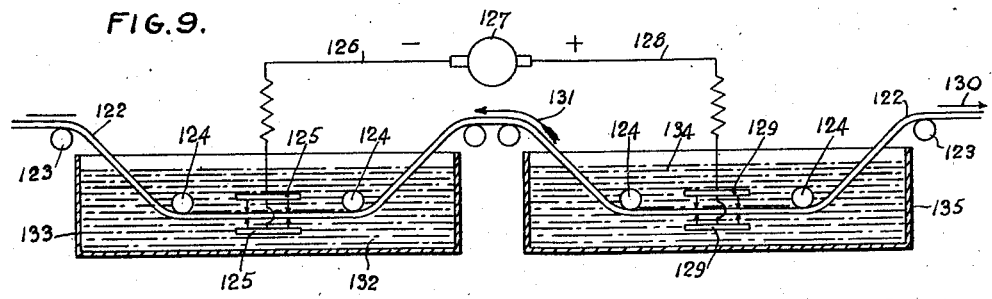
Inventors
CHARLES W. YERGER,
GUERIN TODD,
BY
Toulmin & Toulmin
Attorneys Patented July 11, 1939

2,165,326

UNITED STATES PATENT OFFICE 2,165,326

ELECTROLYTIC TREATMENT OF FERROUS METALS

Charles W. Yerger and Guerin Todd, Matawan, N. J., assignors to Hanson-Van Winkle-Munning Company, Matawan, N. J., a corporation of New Jersey Original application October 30, 1934, Serial No. 750,652. Divided and this application March 30, 1935, Serial No. 13,912

3 Claims. (Cl. 204—5)

This invention relates to electrolytic apparatus for treating metals, and in particular, to improved apparatus for pickling and bright-dipping steel.

One object of our invention is to provide an apparatus for removing coatings of ferrous oxide (FeO), ferric oxide ($Fe_2O_3$), ferric carbonate ($Fe_2(CO_3)_2$) if present, ferrous-ferric oxide ($Fe_3O_4$) and the various carbides and carbon materials formed during the heat treating of ferrous metal, particularly steel.

Another object is to provide an apparatus for removing these iron and carbon compounds by electrolytic action, wherein the article to be treated is made the cathode and current is supplied between it and an anode immersed in the electrolytic solution.

Another object is to provide an apparatus for removing such iron and carbon compounds by electrolytic action in such a manner as to avoid the use of excessive voltage or overheating of the material where this material to be treated has a small cross section in relation to its surface area.

Another object is to provide an apparatus for removing these iron and carbon compounds from metal articles, such as steel sheets or wires, in such a manner as to avoid sparking at the contact point between the material and the rolls or other contact members, thereby preventing injury or marks on the material, which will injure the rolls or dies used in subsequent cold-rolling or drawing operations on the material.

Another object is to provide an apparatus for electrolytically treating metal articles to remove the above-mentioned carbon and iron compounds from the surface thereof, this comprising immersing the article in an electrolytic solution and subjecting it to changed polarities while passing through this solution.

Another object is to provide an apparatus for removing carbon and iron compounds from the surfaces of the metal articles, wherein the article is passed through a plurality of compartments and subjected to opposite electrical polarities in successive compartments.

Another object is to provide an apparatus for removing such iron and carbon compounds from the surfaces of metal articles, such as steel sheets or wire, whereby the article is passed through a plurality of solutions, wholly or partially separated from one another and subjected to different electrical polarities and the passage of electric current in different directions while passing through these several compartments.

Another object is to provide apparatus for subjecting metal articles to electrolytic treatments in order to remove such carbon and iron compounds from their surfaces, the article or articles being passed through an electrolyte in a tank divided into compartments, with a partition having openings for the passage of the wire or strip that are just large enough for the passage of the material and which will prevent, to a great extent, the passage of the electrolyte from one compartment to the other.

Another object is to provide an apparatus for electrolytically treating metal articles in order to remove the previously-mentioned iron and carbon compounds, whereby the article is interposed between the electrodes immersed in the electrolyte and spaced apart from the material so that the current must be conducted through the solution from the electrode to the material, thereby introducing current into the material without direct contact with the material to be treated.

Another object is to provide an apparatus for the electrolytic pickling of articles in sulphuric acid solutions whereby the material is made cathodic for a period, and then anodic, with the optional procedure of again making it cathodic, this reversal of current after the first cathodic period assisting in the removal of scale which has been loosened while the material was cathodic, and promoting the action during the subsequent optional period in which the material is again cathodic.

Another object is to provide an apparatus for preventing the cathodic deposition of iron during the electrolytic treatment of ferrous articles, such as steel wire or strip, when these are made cathodic, the apparatus comprising a tank divided into compartments, or separate tanks, wherein the polarity of the articles is successively changed from cathodic to anodic polarity with as many reversals of polarity as are deemed desirable.

Another object is to provide an apparatus for pickling and bright-dipping steel articles either in continuous strips or wires, or in separate sheets, the removal of the surface coatings of iron and carbon compounds being accomplished by reversal of polarity of the article while immersed in an electrolyte or electrolytes, yet at the same time preventing the rapid dissolving of the steel and avoiding the pitting of its surface.

Another object is to provide an apparatus for conveying ferrous metal articles from one tank to another, either in continuous strip or in separate pieces, such as by automatic means, whereby the polarity of each article is changed as it passes from one tank to another, so that the same current may be used twice, with sufficient voltage to overcome twice the normal solution resistance, this being a great deal cheaper in generator cost than double the current at a low voltage.

Another object is to provide an apparatus for electrolytically treating metal products wherein the product is free from direct contact with the conductors carrying the electric current, the circuit being made through a portion of the electrolyte.

This application is a division of my copending application, Ser. No. 750,652, filed October 30, 1934.

In the drawings:

Figure 5 is a diagrammatic representation of a bright-dipping tank to be used on material from which most of the scale has been previously removed, and including separate compartments in which the material is subjected to opposite polarities, thereby avoiding the deposition of iron upon the material in undesirable amounts.

Figure 6 is a diagrammatic representation, in longitudinal cross section, through a series of tanks wherein separate metal articles are to be treated and subjected to changing polarities, rather than articles in a continuous strip or thread of material.

Figure 7 is a diagrammatic representation, in longitudinal cross section, of an apparatus for feeding the sheets by rubber or rubber-coated rollers and from and to rubber-lined guides.

Figure 8 illustrates a conveyor used in the practice of our invention.

Figure 9 is a diagrammatic representation, in longitudinal cross section, showing the use of our invention in plating.

In general, the invention consists of an apparatus for electrolytically treating metal articles, such as steel sheets, wires or plates, either in continuous or separated form, wherein the article is subjected to changing polarities while being treated. Hitherto when thin steel strips or wires have been pickled, either of two defects is sometimes encountered. If the material being treated has a small cross section in relation to its area, it will not carry the heavy current required by the pickling process, from the portion immersed in the solution to the contact rolls that would normally be placed above and at the ends of the tank, without requiring excessive voltage or overheating the material. On the other hand, in case the material is of sufficient thickness to carry the current to the rolls, there is great danger that there will be sparking at the contact points between the material and the rolls, thereby causing marks on the material, which will injure the rolls or dies used in subsequent cold-rolling or drawing operations on the material.

While it is possible to make contact with the material at several points within the length of the tank, there are many conditions which frequently make it inadvisable to do so. Hitherto also, when the steel article has been made the anode and the current passes from the article to a cathode, the electrolyte used to produce a bright finish on steel by this method contains iron after being used for a short time, this iron being obtained from the dissolving of the steel wire or strip in the electrolyte by chemical or electrochemical action, or both. If the material is made cathodic in this solution for a part of this time of immersion, there may be some iron deposited upon it, this deposit of iron interfering with the subsequent anodic treatment. The present invention encountered these problems and resulted in a solution of them.

Figure 1:
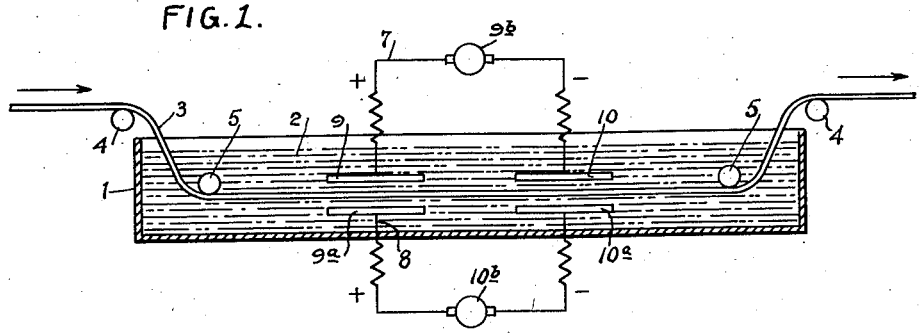
Figure 1 is a diagrammatic representation of a longitudinal cross section through a tank with a continuous strip or wire immersed in an electrolyte with spaced anodes and cathodes, according to our invention.

Referring to the drawings in detail, Figure 1 shows a tank 1 having an electrolyte 2 therein, through which is passed a strip of metal material 3 over external rollers 4 and under immersed rollers 5.

The current of opposite or positive polarity is supplied through the wires 7 and 8 connected to the immersed anode members 9 and 9a and 10 and 10a supplied by generators 9b and 10b. As the electrodes are spaced apart from the material, the current can pass from one to the other only through the electrolyte layers separating them. As there are anode members 9 and 10 on opposite sides of the material strip 3, the latter is subjected to treatment on both of its sides. The pay-off and take-up rolls for moving the material through the tank are not shown. It will be understood that the strip of material 3 may consist of a continuous band or thread of metal, or else it may be composed of metal netting or similar woven or perforated material, or a succession of sheets.

As the material passes between the electrodes 9 and 9a and 10 and 10a, the electrolytic action takes place and the surface is accordingly attacked, resulting in the loosening of the scale thereon. The electrolyte 2 consists preferably of a sulphuric acid solution. The combined action of the electrolyte and the electric current upon the article loosens or dissolves the various deposits of iron and carbon compounds on the surfaces of the metal.

The use of the electric current, as in Figure 1, with the steel as the cathode, accelerates the action of the acid, due partly to the evolution of gas at the cathode and the rapid replenishing of the acid at the cathode surface.

With the proper current density, temperature and acid concentration, as controlled by the particular conditions encountered, the scale and other surface impurities can be removed in from thirty seconds to five minutes, whereas it would require several hours to remove this scale without the use of the current. With the additional provision of the bright-dip, the remaining carbon and carbide deposits can be removed and perfectly clean steel surfaces produced. Various types of solutions and treatments may be used in the practice of passing articles between the spaced anodes and cathodes arranged at intervals.

Figure 2:
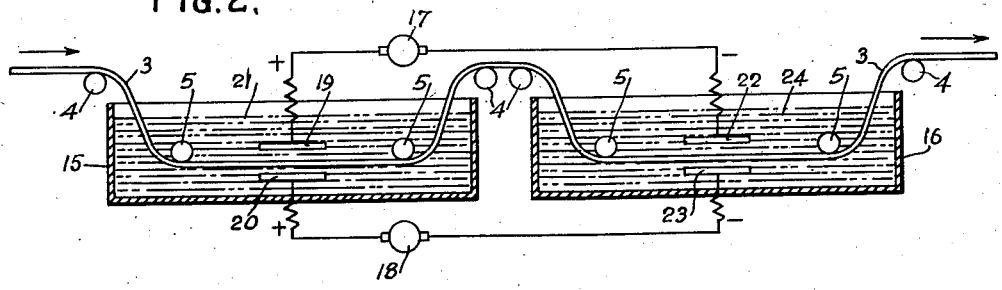
Figure 2 is a diagrammatic representation of a longitudinal cross section through a pair of tanks, the material being passed from one tank to the other with opposite polarities, the material having sufficient cross sectional area to carry the current.

In Figure 2 is shown our apparatus for cathodic pickling and bright-dipping electrically.

This apparatus is especially adapted to the electrolytic treatment of thin, wide steel strips in extremely long lengths. Such a strip is adaptable to cold-rolling, but before the cold-rolling operation is performed the surface scale must be removed. This can be done by the apparatus shown in Figure 2, by the combined use of cathodic pickling and the bright-dip. In the arrangement shown in Figure 2, the electrical contact between the strip and the negative electrodes is made through the solution rather than by direct contact.

The apparatus shown in Figure 2 consists of a pickling tank 15 and a bright-dipping tank 16. The material strip 3 passes into these tanks over external rolls 4 and under internal rolls 5, in the manner described for Figure 1, but it will be observed that no electrical contact is made between these rolls and the metal strip or wire 3. Instead, the current is produced by generators 17 and 18, whose positive poles are connected to the anodes 19 and 20 immersed in the electrolyte 21 in the tank 15; and whose negative poles are connected to the cathodes 22 and 23 immersed in the electrolyte 24 of the tank 16. The electrolyte consists of any suitable solution, either acid or alkaline or merely aqueous. The electrolyte consists preferably of a sulphuric acid solution for pickling and bright-dipping ferrous material, but may consist of other solutions or molten electrolytes when the process is used for other treatments and on other materials.

In the operation of the apparatus shown in Figure 2, the metal stock 3 passes around the rollers 4 and 5 into the tank 15, where it is subjected to the operation of removing the scale. The material 3 is the cathode in tank 15, and in this case has sufficient cross sectional area to carry the current.

The material then passes into the brightening tank 16, where it becomes the anode. The action in the tank 16 results in a brightening of the surfaces of the material, due to the electrolysis between it and the cathodes 22. In this manner we obtain rapid scale removal in the tank 15, and surface brightening in the tank 16. In Figure 2 there is no contact between the material and the source of electric current except through the solution.

Figure 3:
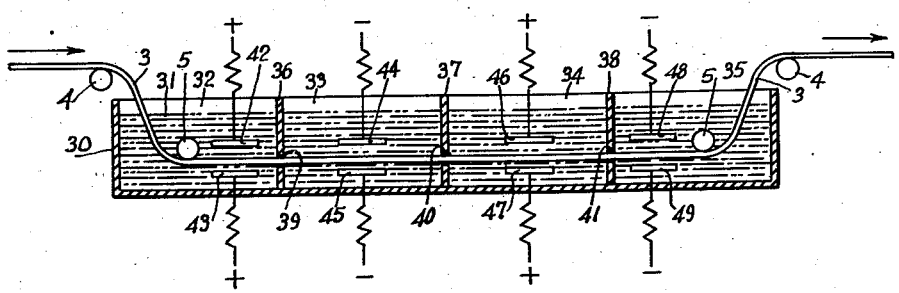
Figure 3 is a diagrammatic representation, in longitudinal cross section, through a tank divided into a series of compartments through which the material passes and is subjected to alternating polarity.

The apparatus shown in Figure 3 consists of a tank 30 containing an electrolyte 31 and divided into various compartments 32, 33, 34 and 35 by means of the partitions 36, 37 and 38. These partitions are provided with apertures 39, 40 and 41 through which the metal stock 3 can pass. The external and internal rolls 4 and 5 guide the material, as before in its passage through the solution.

In the Figure 3 arrangement, however, the material is alternately made the cathode and the anode, as it passes from one compartment to the next. This is accomplished by using anodes 42 and 43 in the compartment 32, cathodes 44 and 45 in the compartment 33, anodes 46 and 47 in the compartment 34, and cathodes 48 and 49 in the compartment 35.

In this arrangement (Figure 3), it has been found that while the electrolytic pickling, as in sulphuric acid solutions, is accomplished most satisfactorily by making the material cathodic, the reversal of current for the time between the two periods in which the material is cathodic will assist in the removal of the surface scale which has been loosened while the material was temporarily cathodic. In this manner the action is promoted during the subsequent period or periods in which the material is cathodic. In the arrangement shown in Figure 3, there is also no direct contact between the source of electric current and the material, this contact being made through the solution.

In the operation of the apparatus shown in Figure 3, the metal stock 3 passes into the electrolytic bath under the guidance of the rollers 4 and 5, and through the exits 39, 40 and 41 in the partitions 36, 37 and 38. In the manner described, it receives the alternate cathodic and anodic charges as it passes from one compartment to another, resulting in the loosening of the scale and the beneficial action on the surfaces, as previously described.

Figure 4:
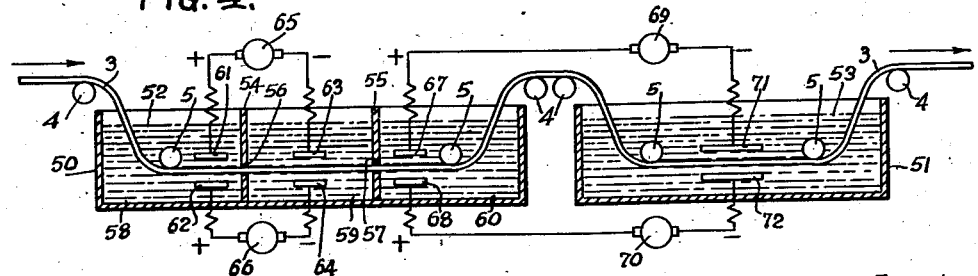
Figure 4 is a diagrammatic representation, in longitudinal cross section, of a pair of tanks for pickling and bright-dipping the material, the latter being subject to changing polarities in the various tanks and compartments thereof.

The arrangement shown in Figure 4 employs a combined scale-removing and brightening action. It consists of a scale-removing tank 50 and a brightening tank 51 containing electrolytes 52 and 53, respectively. The material 3 passes around the guide rollers 4 and 5 in the manner previously described. The scale-removing tank 50 contains partitions 54 and 55, having apertures 56 and 57 adapted to permit the passage of the material strip or wire 3 therethrough. The scale-removing tank 50 is thus provided with separate compartments 58, 59 and 60, through which the material passes while it is alternately made cathodic and anodic. This current action is supplied by the anodes 61 and 62 immersed in the compartment 58, and the cathodes 63 and 64 immersed in the compartment 59. These anodes and cathodes are connected, respectively, to the generators 65 and 66.

The remaining compartment 60 of Figure 4 is served by anodes 67 and 68, connected respectively to the generators 69 and 70. The negative poles of the latter are connected, respectively, to the cathodes 71 and 72 immersed in the electrolyte 53 of the brightening tank 51.

In the operation of the apparatus shown in Figure 4, the material passes into the scale-removing electrolyte 52 and through the compartments 58, 59 and 60, where it is alternately made the cathode and the anode through the action of the electrodes connected to the generators 65, 66, 69 and 70. In general, the time and current required to remove the scale from the steel in the tank 50 are greater than that required to produce a bright surface in the tank 51, so that only a part of the current used in the tank 50 is carried over to the tank 51 for the anodic treatment. The material in passing through the tank 51, if it is susceptible to the brightening treatment, receives bright surfaces through the action of the electrolysis. It will also be observed that no direct contact takes place between the current sources in Figure 4 and the material 3, the contact being made solely through the electrolytes. It will be obvious, however, that contact may be made with the material either inside or outside of the tanks, as previously described.

The apparatus shown in Figure 5 consists of a bright-dip tank 80, arranged to treat material from which most of the scale has been removed previously by electrolytic pickling, simple immersion pickling or other means. In this arrangement the tank 80 is divided by the partition 81 into compartments 82 and 83, between which the material 3 is permitted to pass by way of the aperture 84. The rolls 4 and 5 guide the material 3 in its passage through the apparatus, as before. Current is applied to the material during its passage through the compartment 82 by means of the anodes 85 and 86, connected to the positive poles of the generators 87 and 88, respectively. The negative poles of these generators are connected to the cathodes 89 and 90 immersed in the compartment 83.

In the operation of the apparatus shown in Figure 5, the material 3 passes through the compartment 82, where it is electrolytically treated while serving as a cathode; continues through the aperture 84 into the compartment 83; and is therein acted upon by electrolysis while serving as an anode. This arrangement prevents the depositing of iron, which otherwise tends to occur when the material is made cathodic in the brightening dip. This iron is obtained by reason of the dissolving of the steel wire or strip in the electrolyte by the chemical or electro-chemical action, or both. Consequently, if the material is made cathodic in this iron-bearing solution for a part of the time of immersion, there may be some iron deposited upon it, and this deposit may interfere with the subsequent anodic treatment. In order to prevent this deposit of iron, the apparatus shown in Figure 5 was devised.

The separation of the tank into two compartments, with a partition having openings just large enough for the passage of material, will prevent, to a great extent, the passage of the electrolyte from one compartment to the other. In the first compartment there is very little iron dissolved in the electrolyte, and consequently very little iron deposited on the wire or strip. If the material comes to the tank 80 in a wet condition the wire or strip is continuously removing some of the electrolyte from the second compartment 83 and adding to the electrolyte in the first compartment 82, so that the level of the electrolyte in the first compartment tends to be higher than that in the second compartment, and there is accordingly no flow of solution from the second compartment into the first compartment.

The arrangement shown in Figure 6 is adapted for the electrolytic treatment of separate pieces of material rather than that of material in a continuous strip, as shown in the previous examples. The arrangement of Figure 6 consists of tanks 91 and 92, into which the material is immersed successively by apparatus well known in the art. The metal articles, which may be in the form of steel sheets, are immersed in the electrolyte in the tank 91, and between the anodes 93 and 94. The tank 92 similarly contains cathodes 95 and 96. These anodes and cathodes are connected to the current generators 97 and 98 so that one set of generators supplies both sets of electrodes with current.

The metal articles 99, as stated previously, are immersed in the tank 91 between the anodes 93 and 94, whereupon the electrolytic action results in the removal of scale from the surfaces of the sheet 99. The latter is then lifted out of the tank 91 and immersed in the tank 92, where its polarity changes from cathodic to anodic. The electrolytic action between it and the cathodes 95 and 96 now causes the brightening of the surface to take place, in a manner analogous to that described in Figure 2. Here also there is no direct contact between the current-carrying conductors and the work-pieces 99. The latter may be conveyed from tank to tank by apparatus well known in the art, and requiring no specific description. This apparatus is capable of automatically lifting the metal articles 99 over the partitions between the successive tanks and into the space between the various electrodes. It will be obvious that a single tank, divided into compartments by partitions, might be used in place of the separate tanks 91 and 92.

Referring to Figure 7, 100 designates a pair of rubber-coated guide sheets for guiding the metal strip or strips, or other articles designated 101. The metal 101 is moved through the solution 102 by the rubber-covered rollers 103. The solution may be divided into different solutions, or into different compartments by the apparatus 104. Between each set of rollers 103 are arranged the electrodes of opposite polarity spaced from but adjacent to the metal sheet and immersed in the solution. The anodes 105 and 106 are followed by the cathodes 107 and 108. At the exit end of the tank or tanks is located another pair of rubber-covered guide sheets 109.

In Figure 8 there is provided a conveyor chain 110 from which are suspended by carriers 111 articles to be treated, such as the metal sheets 112. A sliding contact 113 is provided between the carrier and the cathode rail 114. The respective tanks 115 and 116 contain treating solutions. Conventional means (not shown) is provided for lifting the carriers 111 and sheets 112 from tank to tank over the end walls of the tanks, as previously described in connection with Figure 6. Suspended in tank 115 is a plurality of anodes 117 connected to the circuit 118, generator 119, circuit 120 with the cathodes 121 and tank 116. The various types of treating solutions may be employed. For instance, in the two tanks indicated the solutions may be of alkaline cleaner. There can be various types of solutions employed so long as the principle of our invention is practiced.

Referring to Figure 9, the metal strip 122 passes over guide rollers 123, beneath guide rollers 124 and between cathodes 125 that are connected in circuit by the line 126, generator 127, line 128 to the anodes 129, which are also spaced from but adjacent to and not in contact with the metal strip 122, which is traveling in the direction of the arrow 130. The current travels backwardly from the anodes 129, through the metal to the cathodes 125, as indicated by the arrow 131. The cathodes are immersed with the metal in the solution designated 132 in tank 133, and the cathodes are immersed in the solution 134, with the metal in the tank 135. For instance, the solution 134 may be a plating solution and the solution 132 a cleaner solution. This illustrates the adaptability and flexibility of our invention.

It will be understood that we desire to comprehend within our invention such modifications as may be necessary to adapt it to varying conditions and uses. Our invention comprehends any process in which the anode and cathode may be in either or any tank used with pickling, treating or plating in either or any tank.

Having thus fully described our invention, what we claim as new and desire to secure by Letters Patent, is:

1. In an electroprocessing apparatus for pickling and bright dipping ferrous metal strips, a pair of tanks, means for guiding a ferrous metal strip to be worked upon through the electrolyte in each tank and from tank to tank, an acid pickling solution in the first tank, an acid bright dip solution in the second tank, a submerged anode spaced apart from the strip in the acid pickling solution, a cathode spaced apart from the strip submerged in the acid bright dip solution, and a generator having its positive pole connected to the anode in said acid pickling solution and its negative pole connected to the cathode in said acid bright dip solution, said anode and cathode and said acid solutions constituting the sole electrical connections between said generator and said ferrous metal strip.

2. In an electroprocessing apparatus for pickling and bright dipping ferrous metal strips, a pair of adjacent tanks, means for guiding a ferrous metal strip through said tanks and from tank to tank, acid electrolytes in the respective tanks, a pair of spaced anodes on opposite sides of said strip and submerged in the electrolyte in the first tank and a pair of cathodes on opposite sides of the strip submerged in the electrolyte in the second tank, a generator having one pole connected to one of the anodes in the first tank and having its other pole connected to one of the cathodes in the second tank, and a second generator having one pole connected to the remaining anode in the first tank and having its other pole connected to the remaining cathode in the second tank, said anodes and cathodes and said electrolytes constituting the sole electrical connections between said generators and said metal strip.

3. In an electroprocessing apparatus for pickling and bright dipping ferrous metal strips, a pair of adjacent tanks, means for guiding a ferrous metal strip through said tanks and from tank to tank, acid electrolytes in the respective tanks, a pair of spaced anodes on opposite sides of said strip and submerged in the electrolyte in the first tank and a pair of spaced cathodes on opposite sides of the strip submerged in the electrolyte in the second tank, a generator connecting one of the anodes with one of the cathodes, and a second generator connecting the other of the anodes with the other of the cathodes, said anodes and cathodes and said electrolytes constituting the sole electrical connections between said generators and said metal strip, said anodes and cathodes respectively being in opposed relationship on opposite sides of said strip.

CHARLES W. YERGER.
GUERIN TODD.